United States Patent
Petrovic (10) Patent No.: US 7,438,177 B2
(45) Date of Patent: Oct. 21, 2008

(54) DEVICE FOR TRANSFERRING LOADS BETWEEN AT LEAST TWO CONVEYORS

(75) Inventor: Zmaj Petrovic, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 0 days.

(21) Appl. No.: 11/667,241

(22) PCT Filed: Nov. 4, 2005

(86) PCT No.: PCT/FR2005/002754

§ 371 (c)(1), (2), (4) Date: May 8, 2007

(87) PCT Pub. No.: WO2006/051195

PCT Pub. Date: May 18, 2006

(65) Prior Publication Data

US 2007/0261935 A1 Nov. 15, 2007

(30) Foreign Application Priority Data

Nov. 9, 2004 (FR) .................................. 04 11931
Mar. 8, 2005 (FR) .................................. 05 02314

(51) Int. Cl.
  *B65G 17/12* (2006.01)
(52) U.S. Cl. .................................. 198/801; 198/457.03
(58) Field of Classification Search .................. 198/800, 198/801, 456, 457.03, 597
See application file for complete search history.

(56) References Cited

U.S. PATENT DOCUMENTS

| 2,816,646 | A |   | 12/1957 | Stocking |
| 3,982,790 | A |   | 9/1976 | Storm et al. |
| 4,411,353 | A | * | 10/1983 | McDole ................. 198/457.03 |
| 4,846,337 | A | * | 7/1989 | Kuhlmann ................. 198/801 |
| 5,501,316 | A | * | 3/1996 | Hermening et al. .... 198/457.03 |
| 6,644,651 | B2 | * | 11/2003 | Allsup ................. 198/457.03 |
| 2003/0136642 | A1 | * | 7/2003 | Allsup ................. 198/457.03 |

FOREIGN PATENT DOCUMENTS

| EP | 0 232 673 A1 | 8/1987 |
| FR | 2 684 649 | 6/1993 |
| FR | 2 798 370 | 3/2001 |

\* cited by examiner

*Primary Examiner*—James R Bidwell
(74) *Attorney, Agent, or Firm*—Young & Thompson (57) ABSTRACT

A device (4) used to transfer loads between at least two upstream (1) and downstream (2) load conveyors which are intended to convey loads (3) between different work stations. The device includes: an intermediate conveyor (5), part of each of the ends (5', 5') thereof extending alongside the upstream (1) and downstream (2) conveyors; and a lateral holding element (6) for maintaining the loads (3) in the cantilevered position thereof as they are being transferred between the upstream conveyor (1) and the downstream conveyor (2). The device is especially suitable for use in conveying loads using push plate conveyors, particularly in systems including a conveyor change.

18 Claims, 6 Drawing Sheets

DEVICE FOR TRANSFERRING LOADS BETWEEN AT LEAST TWO CONVEYORS

FIELD OF THE INVENTION

This invention relates to the domain of conveying loads by means of plate conveyors or transporters, in particular with a change in conveyor or transporter, and it has as its object a device for transferring loads between at least two conveyors or transporters.

BACKGROUND OF THE INVENTION

Numerous domains of the industry currently use conveyors or transporters of loads to transfer such loads in the form of parts or containers between work stations or toward storage or packaging or else shipping stations.

Furthermore, the use of this type of conveyor or transporter can be carried out in centers for sorting objects or containers and more particularly returnable bottles.

In general, these conveyors or transporters of loads come in the form of elongated tables that are equipped with motorized rollers, placed perpendicularly to their longitudinal axis and aligned parallel to one another or else in the form of plate chains or flexible-strip belts or toothed belts, and the loads to be transported are simply posed so as to be approximately centered on these conveyors, i.e., the conveyors for rectilinear transfer currently come in the form of two small symmetrical chains.

For transfer in the rectilinear direction, the loads are placed essentially along the longitudinal median axis and are optionally guided on the conveyors or transporters by means of lateral rails. To carry out changes in direction, load deflection devices are provided in the form of individual parts or containers that consist of accessory means that push said loads toward the conveyor or transporter by deflection or gradually bring the loads to said conveyor or transporter by deflection.

In the first case, the devices essentially consist of a set of jack thrusts having a plate or the like, actuated by a jack and laterally coming into contact with the part or the container to be deflected and pushing said part or container on a conveyor or transporter that extends perpendicularly to a first conveyor or transporter.

In the case of a deflection, in a less pronounced angular direction, it is also possible to use lateral thrust means that act successively on the part or container to be deflected to bring it gradually to the conveyor or transporter by deflection.

In the presence of such deflection conveyors or transporters, it is also possible to use intermediate transporters with motorized rollers, of which the different rollers that are joined to the deflection transporter or that rejoin a main transporter are of different dimensions to adapt to the angle of deviation between the transporters.

Finally, in this latter case, the intermediate transporters or conveyors can also be of the plate chain type that can undergo a predetermined angular deflection. However, the use of such intermediate transporters requires specific lay-outs for the connection between the initial transporter or conveyor and the deflection transporter or conveyor.

The deflection devices that currently exist certainly perform their roles more or less satisfactorily but are of relatively complex constitution and operation, which can cause operational problems that have the consequence of completely stopping all of the stations served by a set of conveyors or transporters and frequent maintenance interventions. In addition, the complexity of these deflection devices brings about relatively high installation costs.

Finally, in the case of a transfer of loads in the rectilinear direction, there may arise a problem of holding said loads, in particular when they are of a relatively small size, between two extension conveyors or transporters, whereby said loads run the risk of not being correctly entrained by the downstream conveyor or transporter and piling up at the junction between the upstream conveyor and the downstream conveyor. A poor arrangement of the loads on the downstream conveyor may result therefrom, due, for example, to said piling up.

SUMMARY OF THE INVENTION

This invention has as its object to remedy these drawbacks by proposing a load transfer device between at least two conveyors or transporters that make it possible to carry out a change of conveyor or transporter by deflection or alignment while maintaining a perfect arrangement of the loads to be transferred.

For this purpose, the device for transfer of loads between at least two conveyors or transporters, according to the invention, is characterized in that it essentially consists of an intermediate conveyor or transporter that extends, over a portion of each of its ends, in a manner adjacent to the upstream and downstream conveyors or transporters, and by a means for lateral holding of the loads in cantilever position during the transfer between the upstream conveyor or transporter and the downstream conveyor or transporter.

BRIEF DESCRIPTION OF THE DRAWINGS

The invention will be better understood thanks to the description below, which relates to preferred embodiments, provided by way of nonlimiting examples and explained with reference to the accompanying diagrammatic drawings, in which.

DETAILED DESCRIPTION OF THE PREFERED EMBODIMENTS

FIGS. 1a to 1d of the accompanying drawings represent, by way of example, an upstream conveyor or transporter of loads 1 and a downstream conveyor or transporter of loads 2 designed to route loads 3 between different work stations, whereby these upstream transporters or conveyors of loads 1 and downstream transporters or conveyors of loads 2 are connected to one another by a load transfer device 4. In the description below, the term upstream conveyor is used to designate the conveyor by which the loads arrive to be processed by the transfer device, and the term downstream conveyor is used to designate the conveyor by which the loads leave when they have finished being processed by the transfer device.

In FIGS. 1 to 7 of the accompanying drawings, the load 3, which is shown there, is in the form of a box, for example for accommodation of bottles or the like, but can be constituted in any other forms, namely also in the form of a single part, machined or not, or in a set of assembled parts. The load 3, moved on upstream conveyors or transporters 1 and downstream conveyors or transporters 2, is always placed on the latter in a centered manner, i.e. so as to be perfectly balanced when it is found only on these upstream conveyors or transporters 1 or downstream conveyors or transporters 2 and exceeds a portion of its length on both sides of said upstream conveyors 1 and downstream conveyors 2.

According to the invention, the device 4 for transfer of loads 3 between at least two upstream conveyors or transporters 1 or downstream conveyors or transporters 2 essentially consists of an intermediate conveyor or transporter 5 that extends, over a portion of each of its ends 5', 5'', in a manner adjacent to the upstream conveyors or transporters 1 and downstream conveyors or transporters 2 and by a means 6 for lateral holding of loads 3 in cantilever position during the transfer between the upstream conveyor or transporter 1 and the downstream conveyor or transporter 2. This arrangement of the device 4, with the ends 5', 5'' of the intermediate conveyor or transporter 5 that are adjacent to the ends of the upstream conveyors or transporters 1 and downstream conveyors or transporters 2, i.e., with said ends 5', 5'', each beside the corresponding end of said upstream conveyors or transporters 1 and said downstream conveyors or transporters 2, makes it possible that said ends 5' and 5'' extend under the corresponding edges of the loads 3 along the ends of said upstream conveyors or transporters 1 and downstream conveyors or transporters 2.

According to a characteristic of the invention, the intermediate conveyor or transporter 5 is advantageously placed at a level that is slightly lower than that of the upstream conveyors or transporters 1 and downstream conveyors or transporters 2, and the means 6 for lateral holding of the loads extends in parallel above the intermediate conveyor or transporter 5 at a distance that is slightly lower than the height of the loads 3 to be transferred. This means 6 for lateral holding of the loads makes it possible to ensure support of the upper edge of said loads against its lower face so that when said loads leave the upstream transporter 1, they continue to be held in cantilever position on the intermediate conveyor or transporter 5 by gripping their corresponding edge, without running the risk of leaving the latter, because the upper edge of the load rests on the lateral holding means 6 to exert a resistant force, such as an interference effect.

It is also possible, according to another characteristic of the invention, not shown in the accompanying drawings, to use the intermediate conveyor or transporter 5 at a level that is slightly higher than the one of the upstream conveyor or transporter I and the downstream conveyor or transporter 2. Furthermore, according to another characteristic of the invention, not shown in the accompanying drawings, the intermediate conveyor or transporter 5 can also be placed in an inclined manner relative to the upstream conveyor or transporter I and downstream conveyor or transporter 2.

The intermediate conveyor or transporter 5 is preferably of the plate chain type and is equipped with a coating with reinforced adhesion, of the rough and/or elastically deformable coating type, and the lateral holding means comes in the form of a guide, whose lower face turned toward the intermediate conveyor or transporter 5, in contact with the upper edge of the load, is smooth and has a slight adhesion relative to the materials of the load.

According to a characteristic of the invention, not shown in the accompanying drawings, the ends 6' and 6'' of the lateral holding means 6 that extend above the ends 5' and 5'' of the intermediate conveyor or transporter 5 are advantageously in the form of moving parts on the central part of said lateral holding means 6 and are actuated via pneumatic jacks, hydraulic jacks or electric jacks or else cams.

Thus, to carry out the entraining of the load 3 via the intermediate conveyor or transporter 5, it is sufficient to rest the lower part of the corresponding edge of the load 3 on the end 5' of said intermediate conveyor or transporter 5 via the moving part 6' of the lateral holding means 6 (FIG. 1*b*). As a result, this lower edge portion comes into contact with the more adherent coating of the intermediate conveyor or transporter 5 and, when the load 3 leaves the end of the upstream conveyor or transporter 1, it is entirely entrained by the intermediate conveyor or transporter 5 and held on the latter via the lateral holding means 6. The travel via the transfer device according to the invention is therefore travel of the load in cantilever position, the latter being, in a certain manner, gripped between the intermediate conveyor or transporter 5 and the guide that forms the lateral holding means 6 (FIG. 1*c*). Upon the arrival of the load 3 in front of the downstream conveyor or transporter 2 (FIG. 1*d*), when said load 3 is entirely above said downstream conveyor or transporter 2, the moving part 6'' of the guide that forms the lateral holding means 6 is slightly raised by means of its actuator such that the corresponding lateral support of the load 3 on the end 5'' of the intermediate conveyor or transporter 5 is released and the driving of the load 3 is carried out only by the downstream conveyor or transporter 2. This is due to the fact that the intermediate conveyor or transporter 5 is placed at a level that is slightly lower than the one of the downstream conveyor or transporter 2, such that the release of the support on the load 3 by the moving part 6'' of the end of the lateral holding means 6 has the effect of rocking the load 3 on the end of the downstream conveyor or transporter 2 with no more contact with the intermediate conveyor or transporter 5. The load 3 then progresses along the downstream conveyor or transporter 2 in the direction of another work station or another transfer device. Of course, the operation is identical when the intermediate conveyor or transporter 5 is placed at a level that is higher than the one of the upstream conveyor or transporter 1 and downstream conveyor or transporter 2, or when it is inclined relative to the latter.

Figure 1:
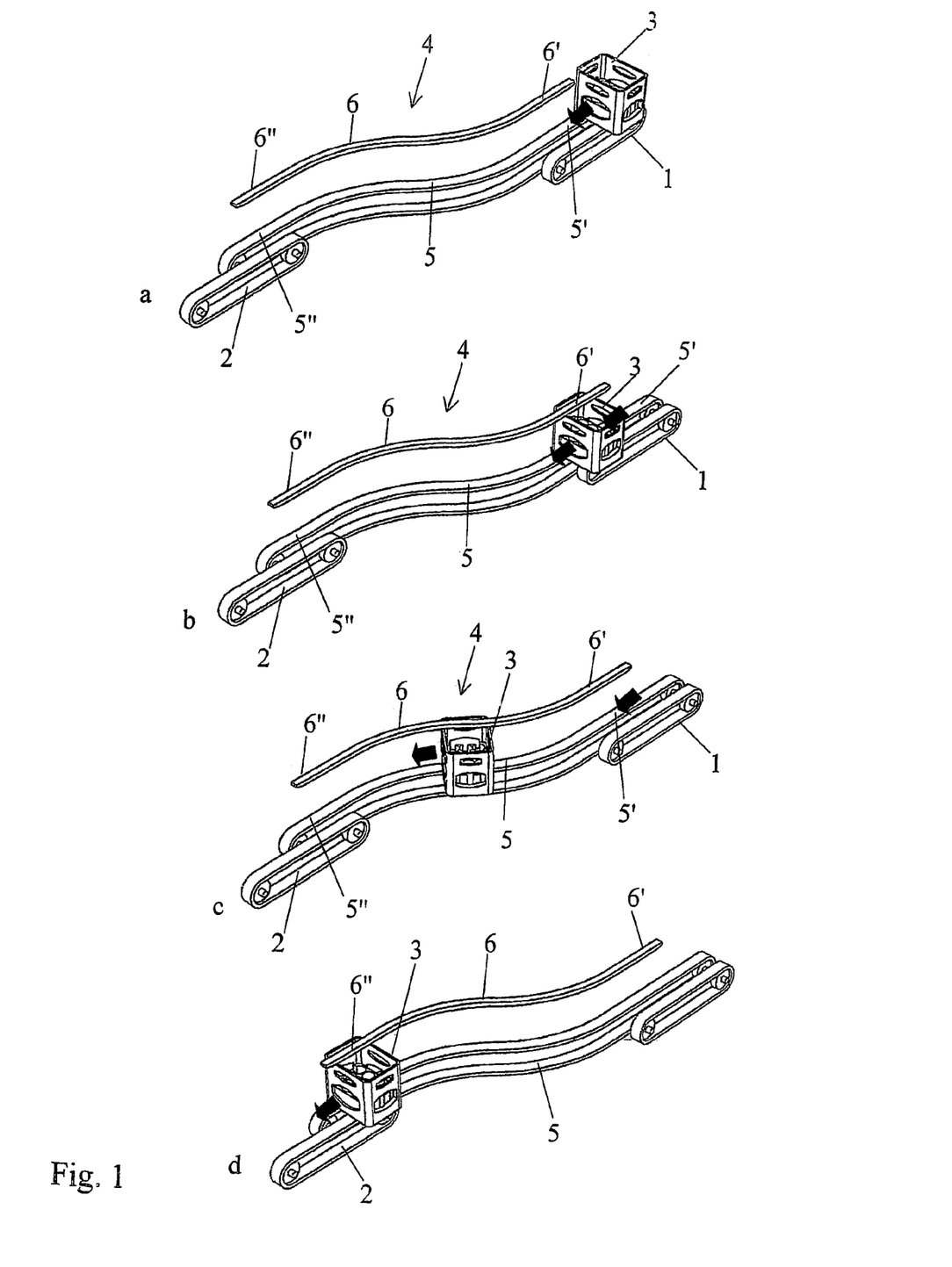
FIGS. 1a to 1d are perspective views representing an embodiment of the device according to the invention.
Figure 2:
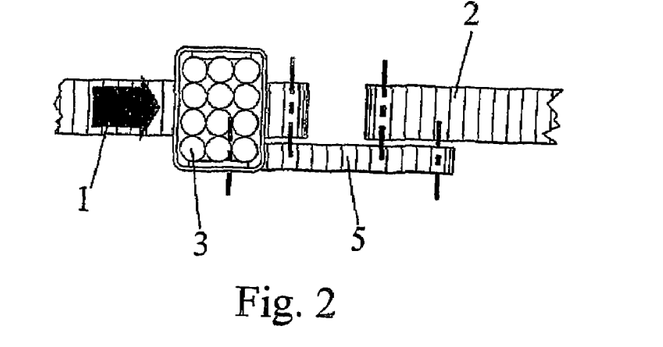
FIGS. 2 to 7 are bird's eye views of variant embodiments of the device, without the means for lateral holding of the loads.

FIG. 2 of the accompanying drawings shows a variant embodiment of the invention, in which the device 4 for transfer of loads 3 between two upstream conveyors or transporters 1 and downstream conveyors or transporters 2 is in the form of a rectilinear device that extends in an adjacent manner to two upstream conveyors or transporters 1 and downstream conveyors or transporters 2 that are aligned with one another. In such a case, the device 4 can be relatively short, whereby the upstream conveyors or transporters 1 and downstream conveyors or transporters 2 can be very close to one another, i.e., their opposite ends can be located at a distance apart that is optionally less than the space occupied, seen in the direction of the transfer of the load 3. Such an embodiment is particularly advantageous for the transfer between two conveyors or transporters that are aligned with one another and that carry out the transfer of loads of relatively small dimensions that currently require generally non-motorized intermediate transfer means that make possible the switching from one to the other by gravity so as to avoid any risk of jamming loads between the ends of the conveyors or transporters or loads piling up at the junction between the latter.

FIGS. 3 to 7 of the accompanying drawings show different variant embodiments of the invention, in which the device 4 for transfer of loads 3 between two upstream conveyors or transporters 1 and downstream conveyors or transporters 2 is in the form of a device that has one or more curvilinear sections that are connected by straight ends, in an adjacent manner, to upstream conveyors or transporters 7 to 10 and to downstream conveyors or transporters 11 to 14.

The principle of operation of various load transfer devices shown in FIGS. 2 to 7 is identical to the one that is described relative to FIGS. 1a to 1d. In FIGS. 2 to 7, however, the lateral holding means 6 is not shown, so as to allow a better comprehension of the passage of the load 3.

In the embodiment according to FIG. 2, the load 3 that is brought on the upstream conveyor or transporter 1 is supported, at the time when it arrives above the intermediate conveyor or transporter 5 of the device 4 for load transfer, on its upper edge, of the side of the device 4, and is thus brought into contact by the lower edge that corresponds to the intermediate conveyor or transporter 5. Up to the outlet of the load 3 of the upstream conveyor or transporter 1, this latter simultaneously rests partially on said upstream conveyor or transporter 1. Upon the arrival at the outlet of the latter, the load 3 no longer rests on the latter and is held entirely by its corresponding edge between the lateral holding means 6 and the intermediate conveyor or transporter 5, whereby the remainder of the load 3 is in cantilever position above the gap between the upstream conveyor or transporter 1 and the downstream conveyor or transporter 2. The reacquisition of the load 3 by the latter is carried out in the way that is described relative to FIGS. 1a to 1d.

Figure 3:
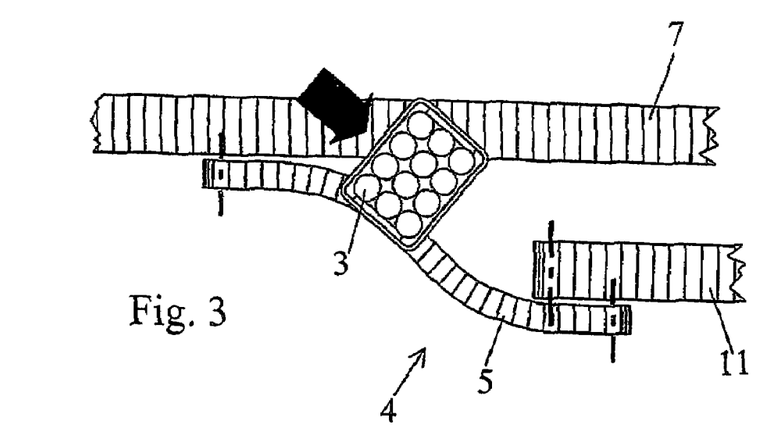

FIG. 3 shows a variant embodiment of the invention, in which the device 4 consists in the form of an element that has two curvilinear sections of opposite curves that make it possible to produce the deflection of a load 3 from an upstream conveyor or transporter 7 toward a downstream conveyor or transporter 11, whereby the two conveyors or transporters are parallel to one another. In this embodiment, the entry of the load 3 in the connecting zone between the device 4 and the upstream conveyor or transporter 7 has the effect—if the lateral holding means 6 was made operational in the manner described relative to FIGS. 1a to 1d, i.e., was supported by its corresponding end on the corresponding edge of the load 3—of causing the entrainment of the load 3 by the load transfer device 4, so that said load 3 is deflected from its passage on the upstream conveyor or transporter 7 to be brought into a transfer position on the downstream conveyor or transporter 11.

Figure 4:
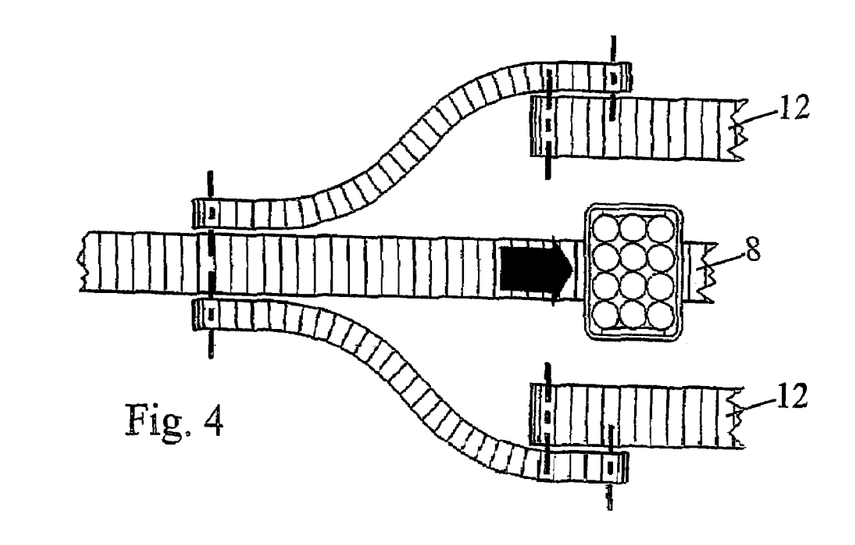
Figure 5:
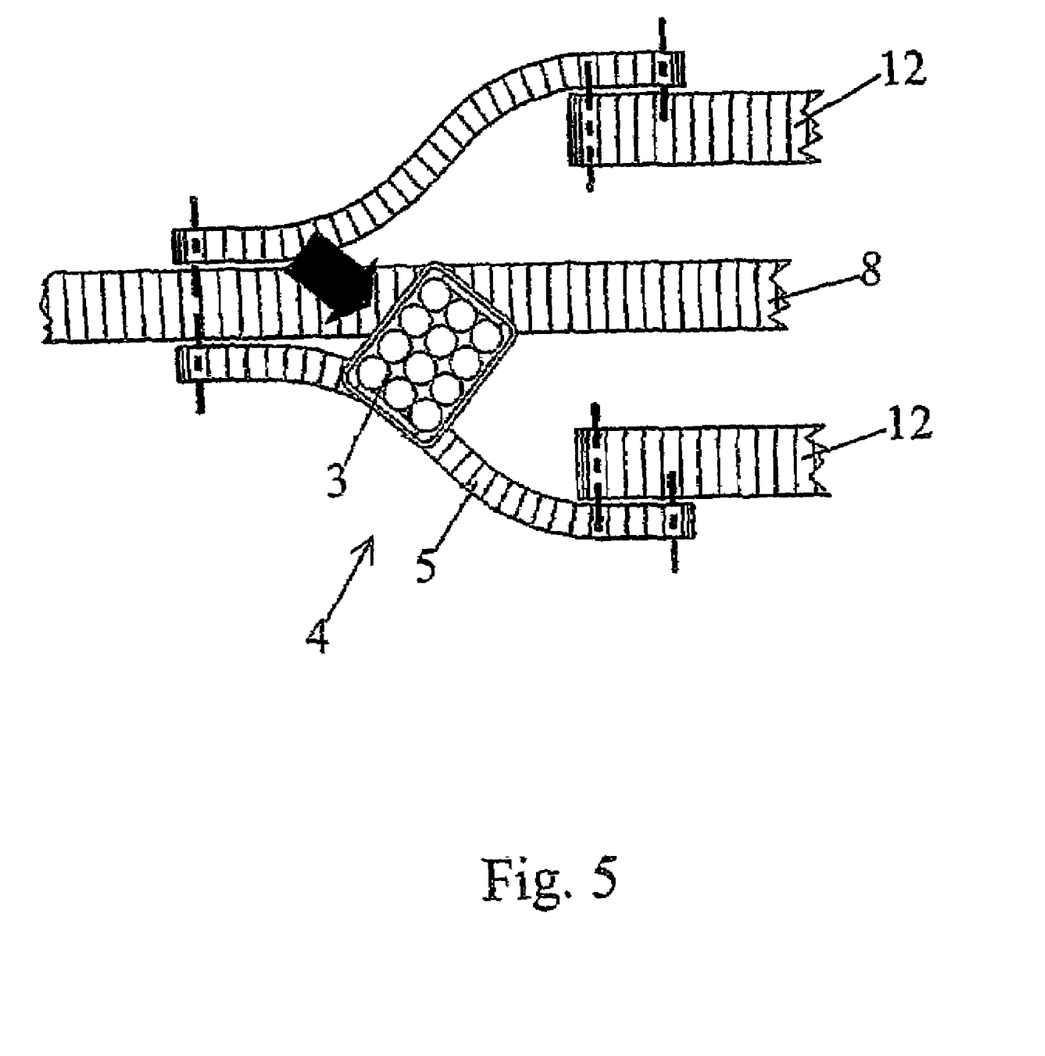

FIGS. 4 and 5 show a configuration of upstream conveyors or transporters 8 and downstream conveyors or transporters 12, in which a central upstream conveyor 8 is deflected toward two downstream conveyors 12 via two devices 4 that are comparable to the one that is shown in FIG. 3 of the accompanying drawings. In this embodiment, the central upstream conveyor 8 is itself designed to carry out a partial transfer downstream. Thus, FIG. 4 shows the operation of the device according to the invention for a transfer of the load in a rectilinear manner on the central upstream conveyor 8, whereas FIG. 5 shows a deflection of the load 3 toward one of the downstream conveyors 12 via the device 4 according to the invention. Regarding FIGS. 4 and 5, the reacquisition of the load is carried out in the same manner as that described relative to FIG. 3.

Figure 6:
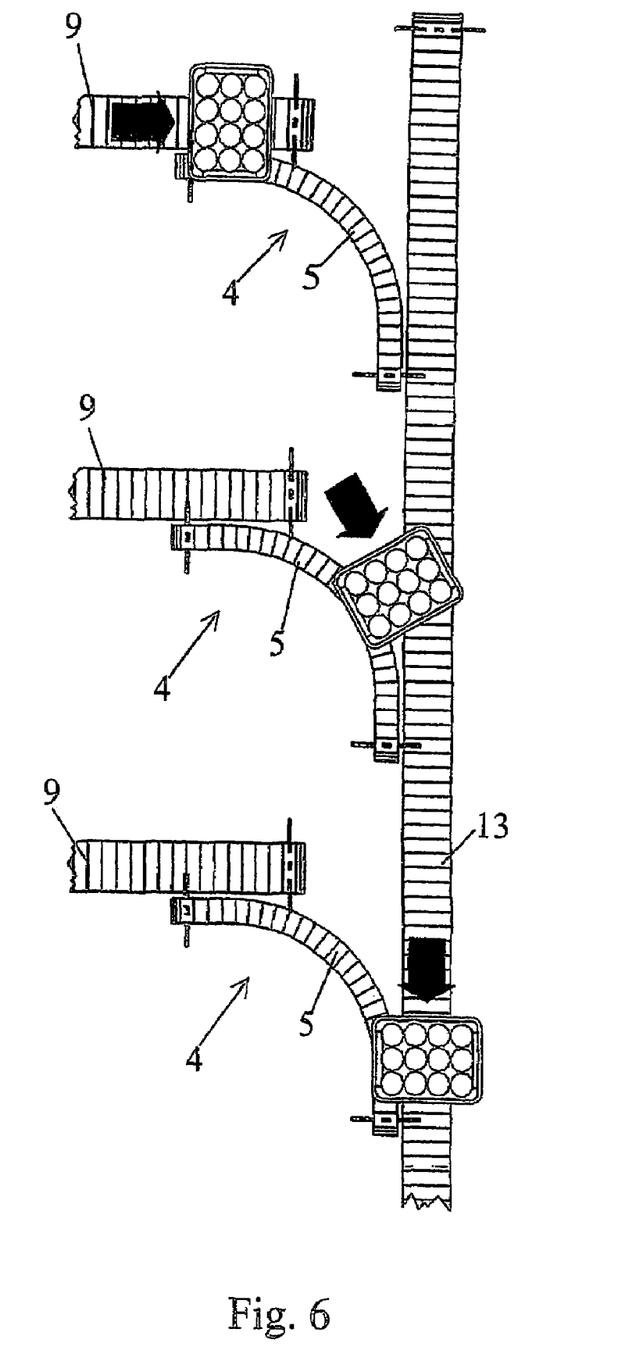
Figure 7:
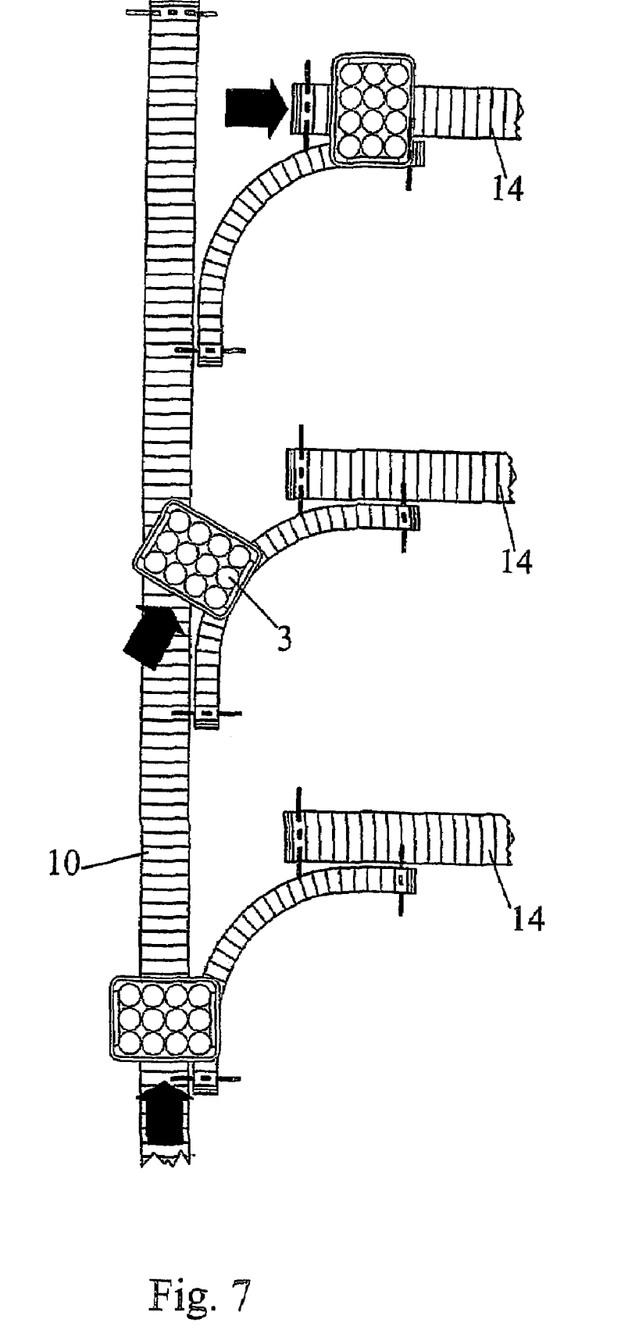

FIGS. 6 and 7 show the application of the device according to the invention in the form of a simple curved element, on the one hand, with a transfer of loads obtained from several upstream conveyors or transporters 9 to a single downstream conveyor or transporter 13, whereby the intermediate conveyors or transporters 5 forming the load transfer devices 4 are connected in an adjacent manner to said upstream conveyors or transporters 9 and downstream conveyors or transporters 13 via their straight ends (FIG. 6), and, on the other hand, to the load transfer obtained from a single upstream conveyor or transporter 10 to several downstream conveyors or transporters 14 (FIG. 7). In this embodiment, the connection of the intermediate conveyors or transporters 5 forming the load transfer devices 4 is carried out in an identical manner to that according to FIG. 6.

The application of the device according to the invention has embodiments such as those shown in FIGS. 6 and 7 and makes it possible to consolidate or sort loads 3 according to predetermined criteria, whereas the embodiments according to FIGS. 3 to 5 are more particularly designed to carry out a distribution of loads 3 toward subsequent predetermined work stations.

Figure 8:
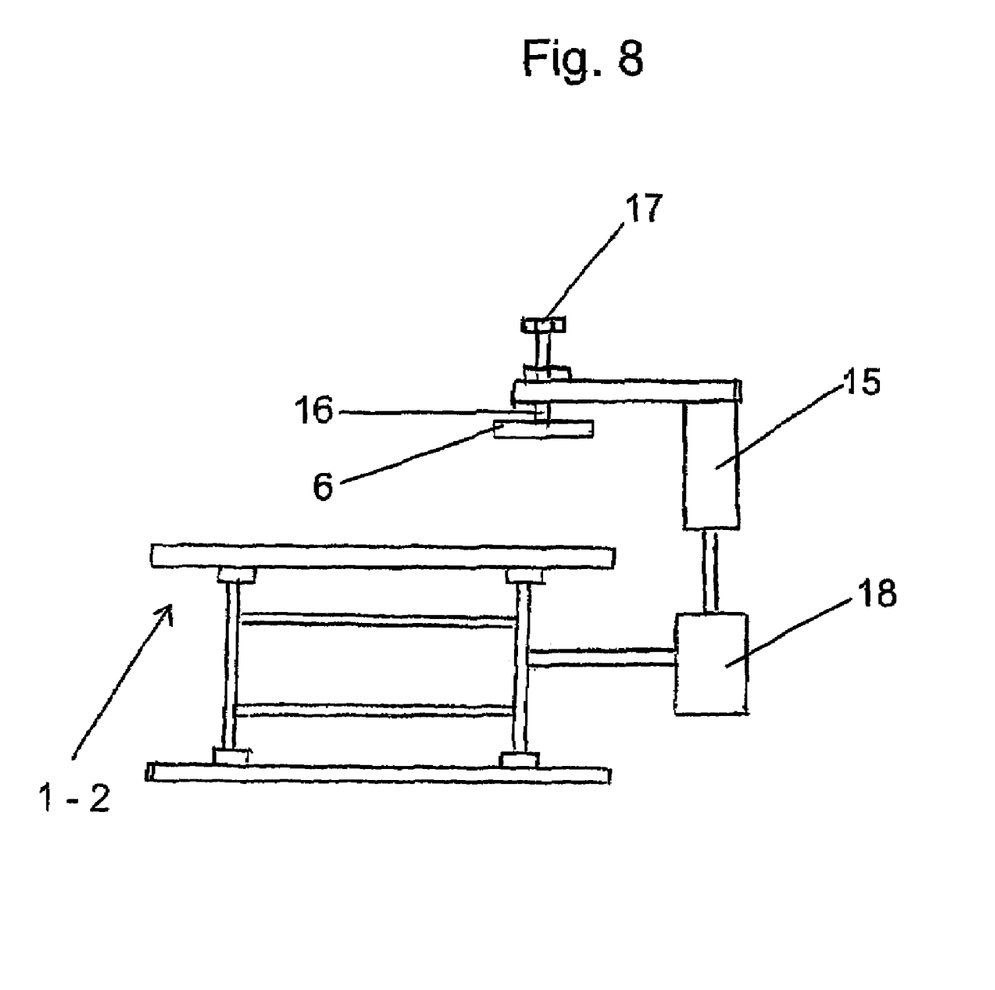
FIG. 8 is a lateral elevation and cutaway view, on a larger scale, that represents the mounting of the lateral holding means of the loads.

According to another characteristic of the invention and as FIG. 8 of the accompanying drawings shows it, the lateral holding means 6 of the loads 3, constituent of the device 4 for transfer of loads 3 between at least two upstream conveyors or transporters 1 and downstream conveyors or transporters 2, is advantageously fixed on the chassis of at least one upstream conveyor or transporter 1 and/or downstream conveyor or transporter 2 via supports 15, on which it is mounted with interposed controlled elastic deformation means 16, such as springs 16 that can be adjusted by screws 17. The result is the possibility of pre-regulating the force of application of the lateral holding means 6 of the loads 3 so as to ensure in all circumstances a good holding of said loads 3 between said means 6 and the intermediate conveyor or transporter 5 by taking into account in particular the possible variations of width of the loads 3.

In addition, to take into account the height variations of the loads 3, based on the nature of said loads 3, i.e., when different series of loads 3 are transferred with the upstream conveyors or transporters 1 and downstream conveyors or transporters 2, the supports 15 of the lateral holding means 6 of the loads 3 are fixed to the chassis of at least one upstream conveyor or transporter 1 and/or downstream conveyor or transporter 2 in such a way that it can be adjusted by sliding and clamping supports 15 in corresponding guiding sleeves (not shown) or by arrangement of said supports 15 on positioning jacks 18 that are integral with the chassis of the upstream conveyor(s) or transporter(s) 1 and/or downstream conveyor(s) or transporter(s) 2. Thus, the means 6 can be regulated in service position before each change in series of loads 3 to be transferred, in a manual or automatic way, via jacks 18, which can then be controlled with a central control unit.

Thanks to the invention, it is possible to produce a device for transfer of loads of all types, between means of transport supplying different work stations, while implementing particularly simple means of constitution, with a low cost and high reliability. The result is that the device according to the invention offers an extremely simple solution to the transfer problems relative to devices existing to date. In particular, the invention finds a very advantageous application in the container transfer field, in particular the transfer of bottles upstream and/or downstream from the preparation station and/or filling of bottles or the like, as well as sorting material.

In addition, because of the simplicity of this device, the production costs as well as the operations for maintaining the conveying means or for transport of loads are considerably reduced. It is the same regarding the number of moving parts, the parts subject to wear and tear, the bulkiness of the equipment and the complexity of the equipment linked to the automation.

Thus, the invention makes it possible to improve the reliability of operation of equipment of this type while allowing the production of a large number of types of connection between conveyors or transporters.

Of course, the invention is not limited to the embodiments described and shown in the accompanying drawings. Modifications are possible, in particular from the point of view of the constitution of various elements or by substitution of equivalent techniques, without thereby exceeding the scope of protection of the invention.

The invention claimed is:

1. Device for transfer of loads between at least two upstream load conveyors or transporters and downstream load conveyors or transporters designed to route loads between different work stations, said device consists essentially of:
   an intermediate conveyor or transporter that extends over a portion of each of its ends in an adjacent manner to the upstream conveyors or transporters and downstream conveyors or transporters; and
   a lateral holding means for holding the loads together with the intermediate conveyor in cantilever position during the transfer between the upstream conveyor or transporter and the downstream conveyor or transporter.

2. Device, according to claim 1, wherein the intermediate conveyor or transporter is placed at level that is slightly lower than that of the upstream conveyors or transporters and downstream conveyors or transporters and the means for lateral holding of the loads extends in parallel above the conveyor or transporter at a distance that is slightly lower than the height of the loads to be transferred.

3. Device, according to claim 1, wherein the intermediate conveyor or transporter is placed at a level that is slightly higher than that of the upstream conveyors or transporters and downstream conveyors or transporters.

4. Device, according to claim 1, wherein the intermediate conveyor or transporter is placed in an inclined manner relative to the upstream conveyors or transporters and downstream conveyors or transporters.

5. Device, according to claim 1, wherein the intermediate conveyor or transporter is of the plate chain type and is equipped with a reinforced adhesion coating, of the rough and/or elastically deformable coating type, and the lateral holding means comes in the form of a guide, whose lower face turned toward the intermediate conveyor or transporter is smooth and has a low adhesion.

6. Device, according to claim 1, wherein the ends of the lateral holding means, extending above ends of the intermediate conveyor or transporter, are in the form of moving parts on the central portion of said lateral holding means and are actuated via pneumatic jacks, hydraulic jacks or electric jacks or else cams.

7. Device, according to claim 1, wherein it is in the form of a rectilinear device that extends in an adjacent manner to two upstream conveyors or transporters and downstream conveyors or transporters that are aligned with one another.

8. Device, according to claim 1, wherein it is in the form of a device that has one or more curvilinear sections that are connected by straight ends, in an adjacent manner, to upstream conveyors- or transporters and to downstream conveyors or transporters.

9. Device, according to claim 1, wherein the lateral holding means of loads, constituent of the device for transfer of loads between at least two upstream conveyors or transporters and downstream conveyors or transporters, is fixed on the chassis of at least one upstream conveyor or transporter and/or downstream conveyor or transporter via supports, on which it is mounted with interposed controlled elastic deformation means, such as springs that can be adjusted by screws.

10. Device according to claim 9, wherein the supports of the lateral holding means of the loads are fixed to the chassis of at least one upstream conveyor or transporter and/or downstream conveyor or transporter in such a way that it can be adjusted by sliding and clamping supports 15 in corresponding guiding sleeves.

11. Device according to claim 9, wherein the supports of the lateral holding means of the loads are fixed to the chassis of at least one upstream conveyor or transporter and/or downstream conveyor or transporter in an adjustable manner by arrangement of said supports on positioning jacks that are integral with the chassis of the upstream conveyor(s) or transporter(s) and/or downstream conveyor(s) or transporter(s).

12. Device, according to claim 2, wherein the intermediate conveyor or transporter is of the plate chain type and is equipped with a reinforced adhesion coating, of the rough and/or elastically deformable coating type, and the lateral holding means comes in the form of a guide, whose lower face turned toward the intermediate conveyor or transporter is smooth and has a low adhesion.

13. Device, according to claim 2, wherein the ends of the lateral holding means, extending above ends of the intermediate conveyor or transporter, are in the form of moving parts on the central portion of said lateral holding means and are actuated via pneumatic jacks, hydraulic jacks or electric jacks or else cams.

14. Device, according to claim 2, wherein it is in the form of a rectilinear device that extends in an adjacent manner to two upstream conveyors or transporters and downstream conveyors or transporters that are aligned with one another.

15. Device, according to claim 2, wherein it is in the form of a device that has one or more curvilinear sections that are connected by straight ends, in an adjacent manner, to upstream conveyors or transporters and to downstream conveyors or transporters.

16. Device, according to claim 2, wherein the lateral holding means of loads, constituent of the device for transfer of loads between at least two upstream conveyors or transporters and downstream conveyors or transporters, is fixed on the chassis of at least one upstream conveyor or transporter and/or downstream conveyor or transporter via supports, on which it is mounted with interposed controlled elastic deformation means, such as springs that can be adjusted by screws.

17. A device for transferring loads between an upstream load conveyor and a downstream load conveyor, said device comprising:
   an intermediate conveyor having first and second ends, said first end overlaps the upstream conveyor and said second end overlaps said downstream conveyor; and
   a support element above said intermediate conveyor that supports the loads in a cantilever position so that said load is held between said support element and said intermediate conveyor during the transfer between the upstream conveyor and the downstream conveyor.

18. A device for transferring loads between an upstream load conveyor and a downstream load conveyor, said device comprising:
   an intermediate conveyor having first and second ends, said first end overlaps and is adjacent to the upstream conveyor, said second end overlaps and is adjacent to said downstream conveyor; and
   a support element vertically above and parallel to said intermediate conveyor, said support element supports a top of the load while said intermediate conveyor supports a bottom of said load, so that said load is supported in cantilever during the transfer between the upstream conveyor and the downstream conveyor.

* * * * *